United States Patent Office.

HEINRICH POLIKIER, OF BERLIN, GERMANY, ASSIGNOR TO ACTIEN-GESELLSCHAFT FÜR ANILIN FABRIKATION, OF SAME PLACE.

BLUE ACID DYE.

SPECIFICATION forming part of Letters Patent No. 680,732, dated August 20, 1901.

Application filed May 14, 1901. Serial No. 60,220. (No specimens.)

*To all whom it may concern:*

Be it known that I, HEINRICH POLIKIER, of Berlin, in the Kingdom of Prussia, German Empire, have invented new and useful Improvements in the Production of Blue Acid Dyes; and I do hereby declare that the following is a full, clear, and exact description thereof, which will enable others skilled in the art to which it appertains to make and use the same.

It is well known that blue acid dyestuffs belonging to the diphenylnaphthylmethane series may be produced by acting with sulfonating agents on the condensation products of tetraälkyldiamidobenzophenone with one of the following amins: methyl, ethyl, phenyl, or tolyl alpha-naphthylamin, (United States Letters Patent No. 647,260, of 1900,) alpha-beta-dinaphthylamin, (British Letters Patent No. 30,015 of 1896,) or benzyl-alpha-naphthylamin, (United States Letters Patent No. 496,435, of 1893.) No statements, however, are given in literature as to the sulfonation of the product obtained from the above-mentioned ketone and alpha-dinaphthylamin. I have now found that the said diphenylnaphthylmethane dyestuff may be easily transformed into the corresponding sulfonic acid, thus yielding a most valuable blue acid coloring-matter.

In carrying out my invention I proceed as follows: Thirty parts, by weight, of the condensation product obtained from tetramethyldiamidobenzophenone and alpha-dinaphthylamin are dissolved in thirty parts of sulfuric acid monohydrate while stirring well, and to the solution obtained fifteen parts of fuming sulfuric acid containing sixty per cent. of anhydride are slowly added, care being taken that the temperature does not surpass 20° centigrade. The mixture is then allowed to repose at this temperature until a test dissolves in diluted sodium-carbonate solution on gently heating. The mass is then poured into water, whereupon the free sulfonic acid will separate. It is filtered off, redissolved in water with the aid of sodium carbonate, and from the solution obtained the sodium salt of the new sulfonic acid is precipitated by means of common salt. The dyestuff thus obtained forms in dry state an indigo-blue powder, soluble in alcohol and very easily soluble in water, forming clear-blue solutions. The aqueous solution remains unchanged on addition of sodium carbonate. It assumes a violet-red coloration on addition of caustic-soda lye.

The dyestuff dissolves in concentrated sulfuric acid to a red solution, which on dilution with ice-water becomes gradually brown, greenish brown, green, and finally clear blue. It dyes wool clear-blue shades of most valuable properties.

Having now described my invention and in what manner the same is to be performed, what I claim is—

The new acid dyestuff of the diphenylnaphthylmethane series, said dyestuff being a sulfonic acid of the condensation product obtained from tetraälkyldiamidobenzophenone and alpha-dinaphthylamin represented by the following formula:

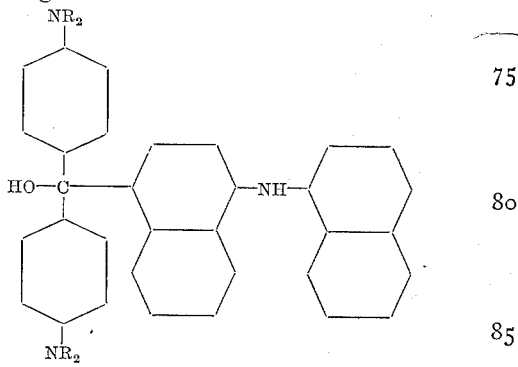

R meaning an alkyl group, said dyestuff forming in the dry state an indigo-blue powder, soluble in alcohol and very easily soluble in water to clear-blue solutions; the aqueous solutions remaining unchanged by the addition of sodium carbonate and assuming a violet-red color on addition of caustic-soda lye; the dyestuff dissolving in concentrated sulfuric acid to a red solution, which on dilution with water becomes gradually brown, greenish brown, green and finally clear blue, the dyestuff producing on wool clear-blue shades.

In witness whereof I have hereunto signed my name, this 27th day of April, 1901, in the presence of two subscribing witnesses.

HEINRICH POLIKIER.

Witnesses:
 WOLDEMAR HAUPT,
 WILLIAM MAYNER.